(No Model.)
G. LA MONTE.
PROCESS OF WATER FINISHING PAPER.
No. 445,898. Patented Feb. 3, 1891.
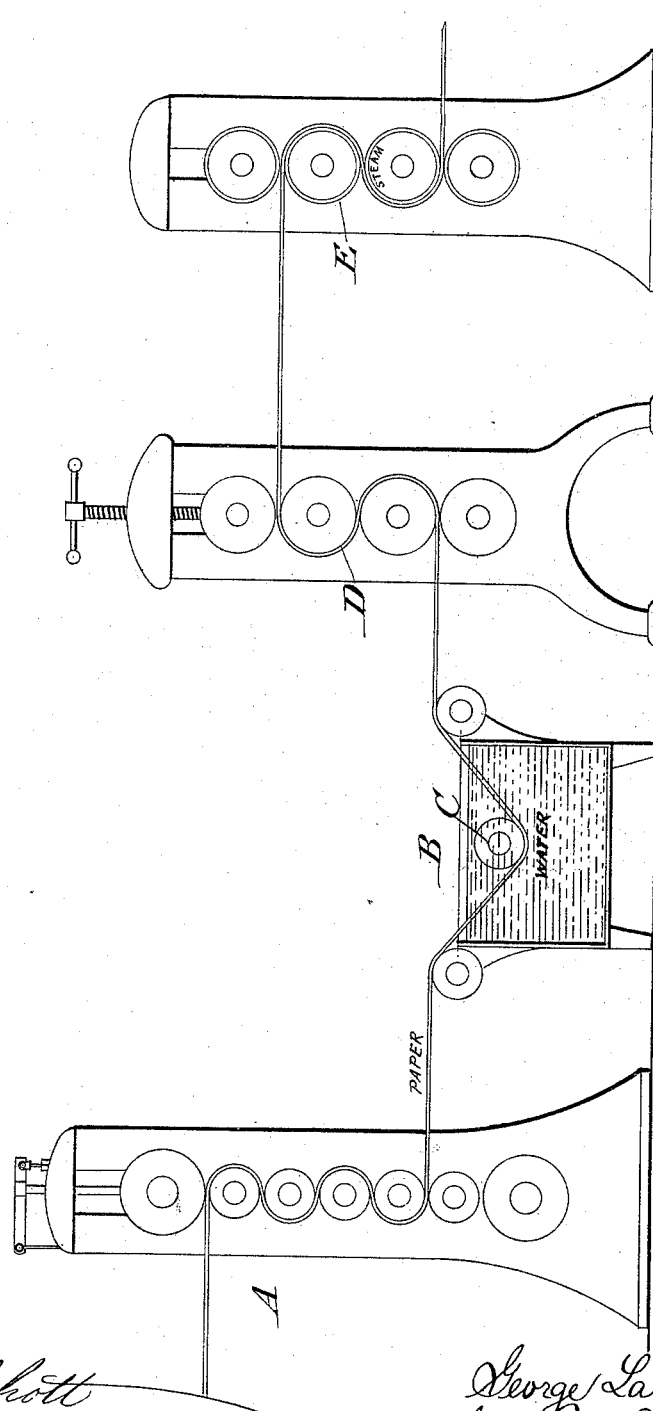
Witnesses
F. H. Schott
Wm. L. Boyden
Inventor
George La Monte
per Fred E. Tasker.
Attorney

UNITED STATES PATENT OFFICE.

GEORGE LA MONTE, OF BOUND BROOK, NEW JERSEY.

PROCESS OF WATER-FINISHING PAPER.

SPECIFICATION forming part of Letters Patent No. 445,898, dated February 3, 1891.

Application filed September 6, 1888. Serial No. 284,732. (No specimens.)

*To all whom it may concern:*

Be it known that I, GEORGE LA MONTE, a citizen of the United States, residing at Bound Brook, in the county of Somerset and State of New Jersey, have invented certain new and useful Improvements in Processes of Water-Finishing Paper; and I do hereby declare the following to be a full, clear, and exact description of the invention, such as will enable others skilled in the art to which it appertains to make and use the same.

This invention relates to a new and improved process or method of water-finishing paper of various kinds—such as, for instance, book-paper, writing-paper, and the like.

The object of the invention is to produce paper having any desired degree of finish, more particularly paper having a very high finish, but without gloss, glaze, or polish, which generally accompanies a high finish, and which is objectionable on account of the reflection from the glossy polish or shiny surface, which is so unpleasant to the eye in reading or writing.

The process consists in completely saturating the paper in water, then pressing the wet paper, and then drying it by artificial or mechanical means, substantially as will be described and claimed.

The accompanying drawing indicates in outline, by way of example only, one arrangement of mechanism which might be employed for carrying the process into practical effect.

Obviously either calendered or uncalendered paper may be subjected to the action of my improved finishing process. When I finish uncalendered paper, I submerge it immediately; but when calendered paper is to be operated upon the paper as it leaves the calendering-rolls may enter the saturating-vat. I have therefore in the drawing indicated a calendering-machine A, between whose rolls the paper passes.

It is immaterial whether the paper on which my process is to act is tub-sized or not.

The first step is to wet the paper thoroughly. Any suitable device may be employed for this purpose. In the form of mechanism that I have illustrated, B designates a vat or tub containing water, and C a submerged roller in said vat. The paper passes beneath this roller, being thus itself completely submerged in the water. The paper in this way is wet upon both sides, and its substance is thoroughly permeated and impregnated with the moistening or dampening liquid. The essence of this first step of my improved process of water-finishing paper is therefore to thoroughly infiltrate and saturate the paper with water. I am aware that in certain calendering processes whose object it is to attain the highest possible degree of finish it has heretofore been customary to apply a certain amount of steam to the surfaces of the paper for the purpose of slightly moistening or dampening the same prior to the action of the heat calendering-rolls upon the said paper. This use of steam, however, is in no sense or degree similar to my water-saturation. The steam in the case just referred to simply diffuses itself upon the surface of the paper with a superficial mellowing effect, slightly dampening it, so that the calendering-rolls may increase the glaze or gloss. The steam cannot be said to water-saturate the paper or thoroughly permeate it, because it is a well-known fact in this use of steam that if a drop of water condenses or falls or is in any way projected onto the paper it will ruin it by spoiling its surface by causing it to adhere to the calendering-roll, and thus being torn and injured. The improved process of water-saturation, being for the purpose of finishing the paper without gloss, is therefore entirely dissimilar from the use of steam employed for heightening the degree of gloss, and is just the step needed to properly fit the paper for the desired finish, which is unaccompanied by the objectionable gloss.

The second step is to press the water-saturated paper between press-rollers, so as to express therefrom all superfluous water, close the pores of the paper, produce a smooth even surface, and thus leave the paper without any gloss. I accomplish this by the use of any suitable kind of pressing-machine, consisting, preferably, of smooth metallic rollers, as D. In addition to freeing it from gloss the stretch is taken out of the paper by this operation. The paper passes directly from the water-vat to and between the press-rollers, and they exert thereon a hard even pressure. The degree of pressure to which the paper is submitted may vary. It is only necessary that there should be sufficient pressure to express the water from the paper, so that it may have a good surface. As it leaves the rollers it has a smooth damp surface which is ready to be dried, but which has no polish, and is of such a nature that it will not acquire any gloss in the drying operation. I am aware that in calendering operations for heightening the gloss the steam-moistened paper is delivered to calendering-rolls, and the resulting paper after it leaves the rolls has a heightened gloss. These calendering-rolls are generally heated. My press-rollers, however, are preferably not heated, but kept in a cold condition. It will be noted, however, that while the effect of the calendering-rolls upon the moistened paper is to create a high polish the effect of my press-rolls upon the water-saturated paper is exactly the reverse and causes the paper to be freed from all gloss, and this difference of result is due to the difference in the process, the water-saturation being a very different step from the steam-moistening of unfinished paper, and the consequent step of passing the paper between rollers being very different from the passing of paper through the calendering-rolls, as is seen from the great difference in the resulting finish. Finally the paper is artificially dried by passing through a drier, so that all dampness and moisture may be at once eliminated and the paper left hard and dry. Any kind of drying apparatus may be employed.

E denotes one form of drier consisting of rollers over which the paper passes. This drying takes place immediately after the paper leaves the press-rollers and is performed as quickly as possible.

By subjecting the paper to the operations involved in the successive steps of my improved process of water-finishing paper, as above described, I am enabled to produce highly-finished paper without gloss. Paper of this kind has long been desired by the trade and various attempts have been made to secure it; but I am not aware that they have been successful until now. It has not heretofore been found possible to separate high gloss from high finish. Either the gloss attended the making of the desired finish or else in securing a freedom from gloss the finish was lost. My water-finishing process overcomes previous difficulties and reaches the desired end. This water-finishing process may be performed upon any kind of manufactured paper. The paper being first fed into the water-saturating vat has all the glaze or polished surface-finish with which it may be possessed at once broken up and destroyed, so that although it is subjected to pressing and drying, which allow it to have the desired degree of finish, yet it has not the objectionable reflective surface which invariably accompanies highly-finished paper as at present manufactured.

The essential novelty of the invention lies in the water-saturation of paper as a primary step, afterward its subjection to pressing between a pair of rollers, and then the immediate artificial drying.

Having thus described my process of water-finishing paper, what I claim as new, and desire to secure by Letters Patent, is—

The herein-described improved process of water-finishing paper without gloss, which consists in first thoroughly saturating the paper with water by passing it through a body of water, then subjecting the wet paper to pressure, and then artificially drying the same in some suitable drying apparatus, substantially as and for the purpose described.

In testimony whereof I affix my signature in presence of two witnesses.

GEO. LA MONTE.

Witnesses:
W. H. WHITING,
CHARLES B. JENNINGS.